United States Patent [19]

Chambers

[11] Patent Number: 5,435,585
[45] Date of Patent: Jul. 25, 1995

[54] FOLDING BALL HITCH WITH SAFETY CHAIN ANCHOR

[75] Inventor: James W. Chambers, Rockford, Ill.

[73] Assignee: Atwood Industries, Inc., Rockford, Ill.

[21] Appl. No.: 302,216

[22] Filed: Sep. 8, 1994

[51] Int. Cl.⁶ .............................................. B60D 1/18
[52] U.S. Cl. ............................... 280/415.1; 280/417.1; 280/901
[58] Field of Search ............... 280/415.1, 416.1, 417.1, 280/432, 441.2, 504, 511, 423.1, 433, 901

[56] References Cited

U.S. PATENT DOCUMENTS

| | | |
|---|---|---|
| 3,889,978 | 6/1975 | Kann ................................ 280/417.1 |
| 4,256,324 | 3/1981 | Hamilton ..................... 280/415.1 X |
| 4,540,194 | 9/1985 | Oane ............................ 280/415.1 X |

OTHER PUBLICATIONS

Letter dated Dec. 8, 1982–from Kenny Larkin Welding. Three sheets of notes and sketches dated Jul. 31, 1992 from Kenny Larkin.

*Primary Examiner*—Margaret A. Focarino
*Assistant Examiner*—Victor E. Johnson
*Attorney, Agent, or Firm*—Leydig, Voit & Mayer, Ltd.

[57] ABSTRACT

A hitch adapted to be mounted in the bed of a pickup truck for towing a trailer having a coupling mechanism and safety chains. The hitch includes a ball adapted to releasably interlock with the coupling mechanism. The ball has an upright position for engaging the coupling mechanism and a stowed position. The hitch further includes vertically oriented rings for engaging the safety chain. The rings are slidably located in horizontal slots in the hitch and are slidably retained in the slots by pins located transversely with respect to the slots. The rings are movable upwardly from stowed positions for engagement with the safety chains. The rings automatically drop to the stowed positions by virtue of gravity acting on the rings after the safety chains have been disengaged from the rings. The stowed positions of the ball and the rings insure that the bed of the pickup is substantially unobstructed by the presence of the hitch when the hitch is not in use.

7 Claims, 2 Drawing Sheets

FOLDING BALL HITCH WITH SAFETY CHAIN ANCHOR

BACKGROUND OF THE INVENTION

This invention relates generally to a ball hitch adapted to releasably interlock with the socket coupling mechanism of a trailer and more specifically to a folding ball hitch adapted to be mounted in the bed of a pickup truck and adapted to releasably interlock with the gooseneck socket coupling mechanism of a fifth wheel trailer.

A ball hitch which is mounted in the bed of a pickup truck is located near the longitudinal center of the bed so that the weight of the trailer is evenly distributed between the tires on the two sides of the pickup. This type of hitch is typically secured in an opening in the bed of the truck so that a substantial portion of the hitch is located below the bed. In addition, the ball typically may be removed or lowered to a stowed position below the bed. These provisions insure that use of the bed is not substantially hindered by the presence of the ball.

Safety chains may be secured between the trailer and an anchor in the hitch to prevent the trailer from breaking away from the pickup truck in the event that the gooseneck uncouples from the ball. To insure that the safety chain anchor does not substantially obstruct the bed of the truck when the hitch is not being used, the anchor must be adapted so that it may be removed from the hitch or so that it may be lowered to a stowed position in the hitch.

One prior anchor utilizes a pin which is secured to the periphery of a ring and which is pivotally received in the hitch. The pin allows the ring to pivot between a vertical position where the ring is capable of engaging the safety chain and a horizontal or stowed position. In addition, the pivoting or folding anchor may be located in a recessed area in the hitch. While this type of folding anchor is feasible, it is relatively expensive to manufacture and to incorporate into a hitch.

SUMMARY OF THE INVENTION

The general aim of the present invention is to provide a new and improved safety chain anchor for use with a ball hitch wherein the anchor does not project upwardly from the hitch when the safety chain is disengaged from the anchor.

Another objective of the invention is to achieve the foregoing by providing for a relatively inexpensive anchor which is capable of being incorporated into a ball hitch by relatively simple manufacturing techniques.

A more detailed objective of the present invention is to provide for an anchor which has an upright position for engagement with the safety chain and which has a stowed position, wherein the anchor automatically returns to the stowed position after the safety chain has been disengaged from the anchor.

A still more detailed objective is to achieve the foregoing by providing for a vertically positioned ring which is slidably received in a horizontally extending slot in the hitch so that the ring is manually upwardly movable and so that the ring is downwardly movable by virtue of gravity acting on the ring.

Another detailed objective of the present invention is to achieve the foregoing by providing for a pin which is located in the center of the ring and which is secured to the hitch so that the pin restricts upward and downward movement of the ring within predetermined limits.

These and other objects and advantages of the invention will become more apparent from the following detailed description when taken in conjunction with the accompanying drawings.

Figure 1:
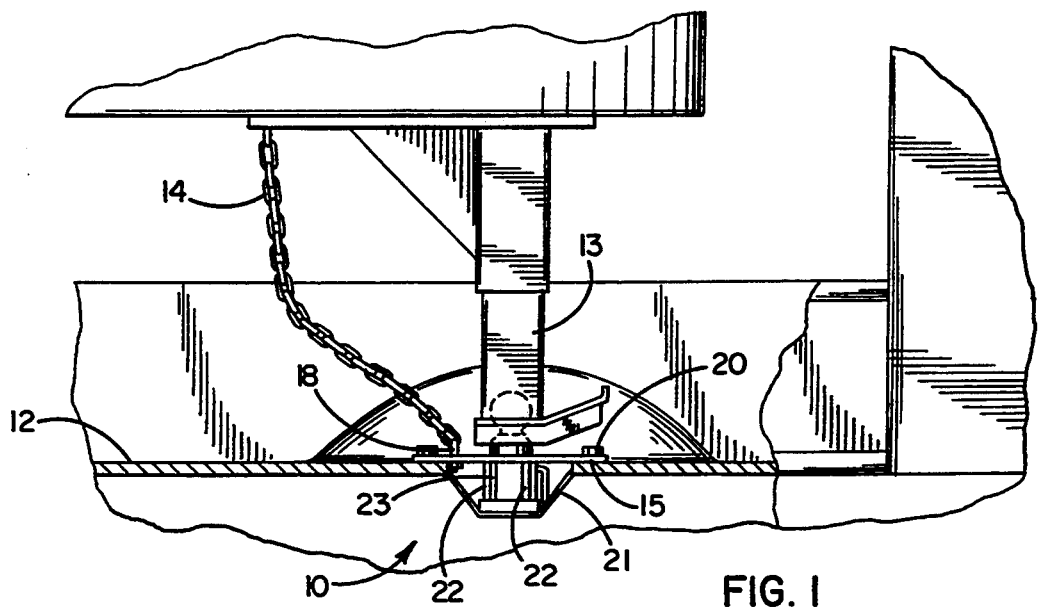
FIG. 1 is a side view of a typical folding ball hitch coupled to a gooseneck trailer and equipped with new and improved safety chain anchors incorporating the unique features of the present invention.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the present invention has been shown in the drawings as embodied in a hitch 10 (FIG. 1) which is adapted to be mounted in the bed of a pickup truck 12 and which is adapted to releasably interlock with the gooseneck socket coupling mechanism 13 and safety chains 14 of a fifth wheel trailer.

Figure 2:
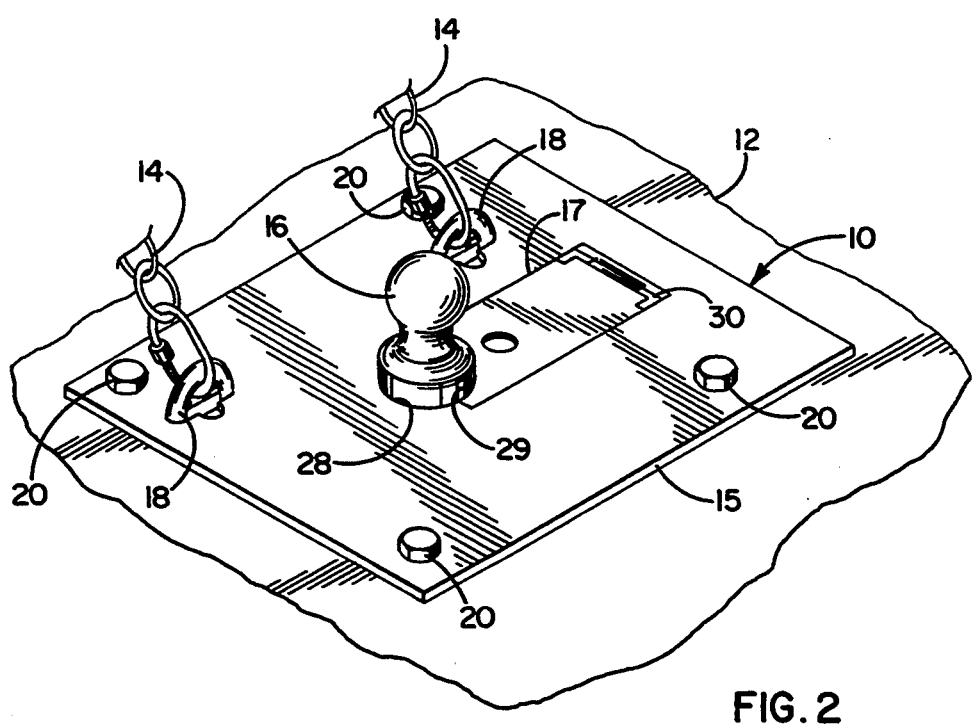
FIG. 2 is an enlarged perspective view of the hitch.

The hitch 10 (FIG. 2) includes a mounting plate 15, a ball 16 which is adapted to releasably interlock with the coupling mechanism 13, a ball cover 17, and two anchors 18 which are capable of engaging the safety chains 14. The hitch is secured to the bed of the pickup truck 12 by fasteners 20 received through openings in the mounting plate and through openings in the bed of the pickup. A V-shaped gusset plate 21 (FIG. 1) and two parallel support plates 22 are welded to each other and 35 to the underside of the mounting plate. The gusset plate and the support plates provide the structural framework of the hitch.

Figure 4:
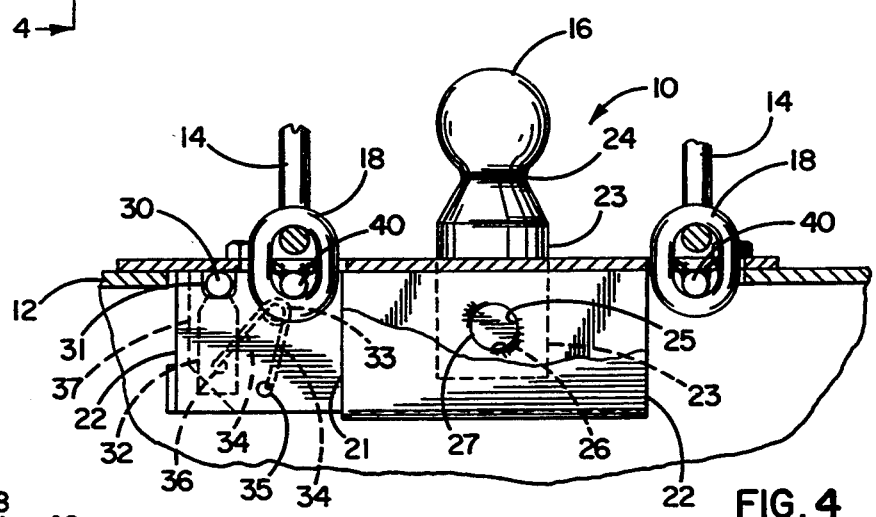
FIG. 4 is an cross-sectional view taken substantially along the line 4—4 of FIG. 3. and shows the ball and the anchors in their upright positions.
Figure 5:
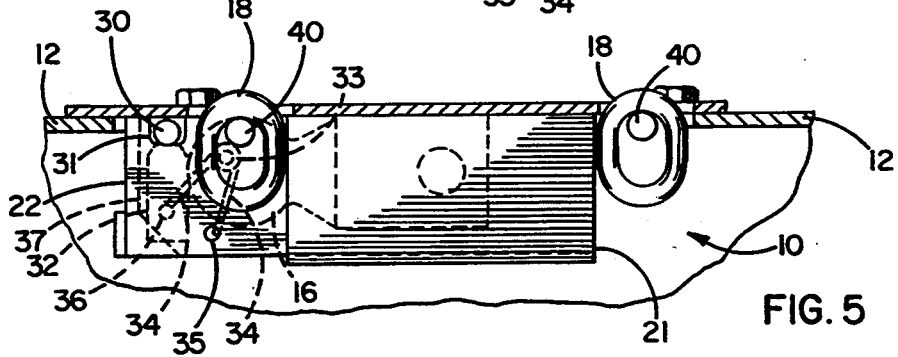
FIG. 5 is a view similar to FIG. 4 but shows the ball and the anchors in their stowed positions.

The ball 16 is selectively positionable in either an upright active position (FIG. 4) for engagement with the coupling mechanism 13 or in a horizontally stowed position (FIG. 5) below the ball cover 17. The ball is formed with an integral shank 23 extending from the base 24 of the ball. The shank is positioned between the two parallel support plates 22 so that the support plates are located forwardly and rearwardly from the shank. An opening 25 in each support plate and an opening 26 in the ball are aligned and slidably receive a pivot pin 27. Each of the ends of the pivot pin are welded to a support plate. The ball pivots about the pivot pin 27 between the upright position and the stowed position.

Figure 3:
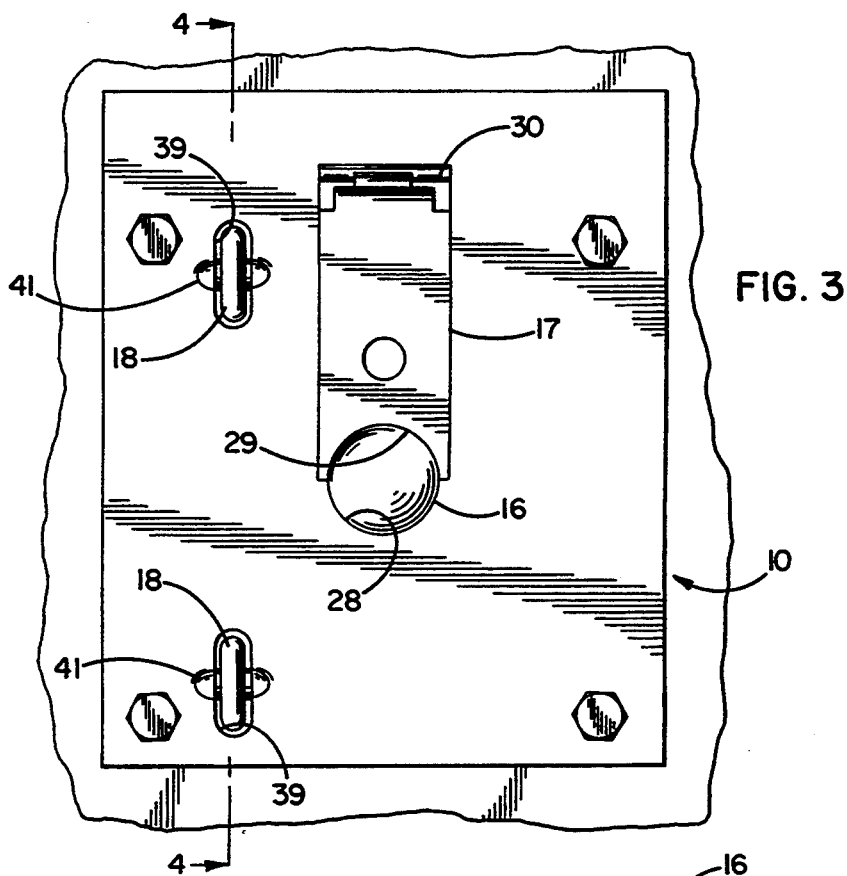
FIG. 3 is a top view of the hitch.

The ball cover 17 pivots about a pivot pin 30 (FIG. 3) which is welded to the underside of the outboard end of the ball cover. The pivot pin 30 is slidably received in slots 31 formed in each of the support plates 22. The pivot pin 30 is rotatably trapped in the slot 31 by the mounting plate 15 after the support plates have been welded to the underside of the mounting plate. An integrally formed arm 32 extends downwardly from the pivot pin 30 when the ball cover is in the horizontal position.

The ball cover 17 is pivotable between a horizontal position and a generally upright position (not shown). The upright position is a temporary position which allows the ball 16 to be raised and lowered. The ball cover normally rests in the horizontal position on the upper surfaces of the two support plates 22. When the ball 16 (FIG. 3) is raised to the upright position, one-half of the circumference of the shank 23 fits snugly into a semi-circular opening 28 in the mounting plate. A similar sized semi-circular opening 29 in the free end of the cover fits snugly around the remainder of the circumference of the shank when the cover is returned to the horizontal position and locks the ball in the upright position.

The ball cover 17 is biased toward the horizontal position by a torsion spring 33. The spring coil of the torsion spring is wound helically from round spring wire. The ends 34 of the torsion spring extend tangentially from the spring coil and define axially extending tangs. The tang at one end of the torsion spring is secured in an opening 35 in a support plate 22. The tang at the other end of the torsion spring is secured in an opening 36 in the lower end of the arm 32. As the ball cover is raised from the horizontal position, the arm 32 rotates upwardly causing the elastic force in the torsion spring coil to increase. Therefore, as the ball cover is raised, the torsion spring tends to increasingly urge the ball cover back toward the horizontal position.

A lifting hook 37 (FIG. 5) raises the ball 16 from the stowed position. The hook is secured to the underside of the ball cover 17 near the pivot pin 30. The hook is formed from a flat strip and is formed with a bend so that the hook extends downwardly and at an angle from vertical to reach under the ball when the ball is in the stowed position. The hook rotates counter-clockwise as the cover is raised from the horizontal position. If the ball is in the stowed position when the cover is raised, the hook engages the underside of the ball and causes the ball to pivot upwardly. When the ball becomes exposed above the mounting plate 15, the ball can be grasped and manually raised to the full upright position.

In accordance with the present invention, each anchor 18 is uniquely constructed so that the anchor may be manually raised for engaging with a safety chain 14 and so that the anchor will automatically drop to a stowed position when the safety chain is disengaged from the anchor. As a result, the bed of the truck 12 remains substantially unobstructed by the presence of the anchors when the coupling mechanism 13 and the safety chains are removed from the hitch 10.

More specifically, each anchor 18 (FIG. 4) is a vertically oriented ring or chain link and is located in a horizontal slot 39 formed in the mounting plate 15. As shown, two rings are provided in a standard hitch 10. The slots extend through the mounting plate, from the upper surface of the plate through to the lower surface of the plate. Each slot is shaped and dimensioned so that each ring is slidably received in the slot.

A pin 40 extends transversely across each slot 39 and through the center of the ring 18. The pin is secured to the underside of the mounting plate 15. The ring is free to move upwardly and downwardly in the slot within the dimensional limits of the outer periphery of the pin and the inner periphery of the ring. A recess 41 is formed in the upper surface of the mounting plate 15, transversely to and extending across each slot, to facilitate grasping the ring when it is in the stowed position.

When a safety chain 14 is to be secured to a ring 18, the ring is manually slid upwardly to a position substantially above the mounting plate 15. A coupling link at the end of the chain may then be engaged through the center of the ring. When the safety chain is removed from the ring, gravity causes the ring to drop vertically in the slot 39 until the inner periphery of the ring engages the pin 40.

The illustrated ring 18 projects just slightly above the mounting plate 15 (FIG. 5) when the ring is in the stowed position. It is apparent, however, that the present invention is readily adapted so that the location of the ring can be raised or lowered relative to the mounting plate.

From the foregoing, it will be apparent that the present invention brings to the art a new and improved safety chain anchor 18 which is upwardly movable for engagement with a safety chain 14 and which is adapted to automatically drop to a stowed position by virtue of gravity acting on the anchor when the safety chain is disengaged from the anchor. Accordingly, the safety chain anchor of the present invention is relatively inexpensive when compared with prior stowable safety chain anchors.

I claim:

1. A hitch adapted to be mounted to a vehicle for releasably interlocking with a coupling mechanism secured to a trailer having a safety chain, said hitch comprising a support secured to said vehicle, said support having an upper surface and having an opening extending downwardly from said upper surface, a ball mounted on said support for movement between an upright active position and a generally horizontal stowed position, said ball projecting above said upper surface to releasably interlock with said coupling mechanism when said ball is in said upright position, said ball being located below said upper surface when said ball is in said stowed position, a pin secured to said support, and anchor means slidably received in said opening for releasably engaging with said safety chain, said anchor means engaging said pin and being movable upwardly and downwardly with respect to said pin such that said pin restricts the upward and downward movement of said means within a predefined limit wherein said anchor means is substantially below said upper surface when said chain is disengaged from said anchor means.

2. A hitch as recited in claim 1 wherein said anchor means comprises a substantially closed-loop member having an inner periphery and wherein said pin is received in said inner periphery.

3. A hitch as recited in claim 1 wherein said support includes a plate having said upper surface and a lower surface and wherein said opening comprises an elongated slot extending from said upper surface to said lower surface.

4. A hitch as recited in claim 3 wherein said pin is secured to said lower surface of said plate and extends transversely of said slot.

5. A hitch adapted to be mounted in a bed of a pickup truck for releasably interlocking with a coupling mechanism secured to a fifth wheel gooseneck trailer having a safety chain, said hitch comprising a mounting plate secured to said bed, said mounting plate having an upper surface, a support secured to said mounting plate, a ball mounted on said support for movement between an upright active position and a generally horizontal stowed position, said ball projecting above said upper surface to releasably interlock with said coupling mechanism when said ball is in said upright position, said ball being located below said upper surface when said ball is in said stowed position, a vertically extending opening formed through said mounting plate, a ring adapted to slidably move in said opening, and a pin located in said ring and secured to said mounting plate whereby said ring may be slid upwardly in said opening for releasably engaging with said safety chain and whereby said ring drops down and substantially below said upper surface when said safety chain is disengaged from said ring.

6. A hitch as recited in claim 5 wherein said plate further comprises a lower surface and wherein said pin is secured to said lower surface.

7. A hitch as recited in claim 5 wherein said ring has an inner periphery that is substantially greater than the diameter of said pin.

* * * * *